May 1, 1945.   G. H. HUFFERD   2,375,110
BRAKE CONTROL VALVE
Filed Aug. 23, 1943
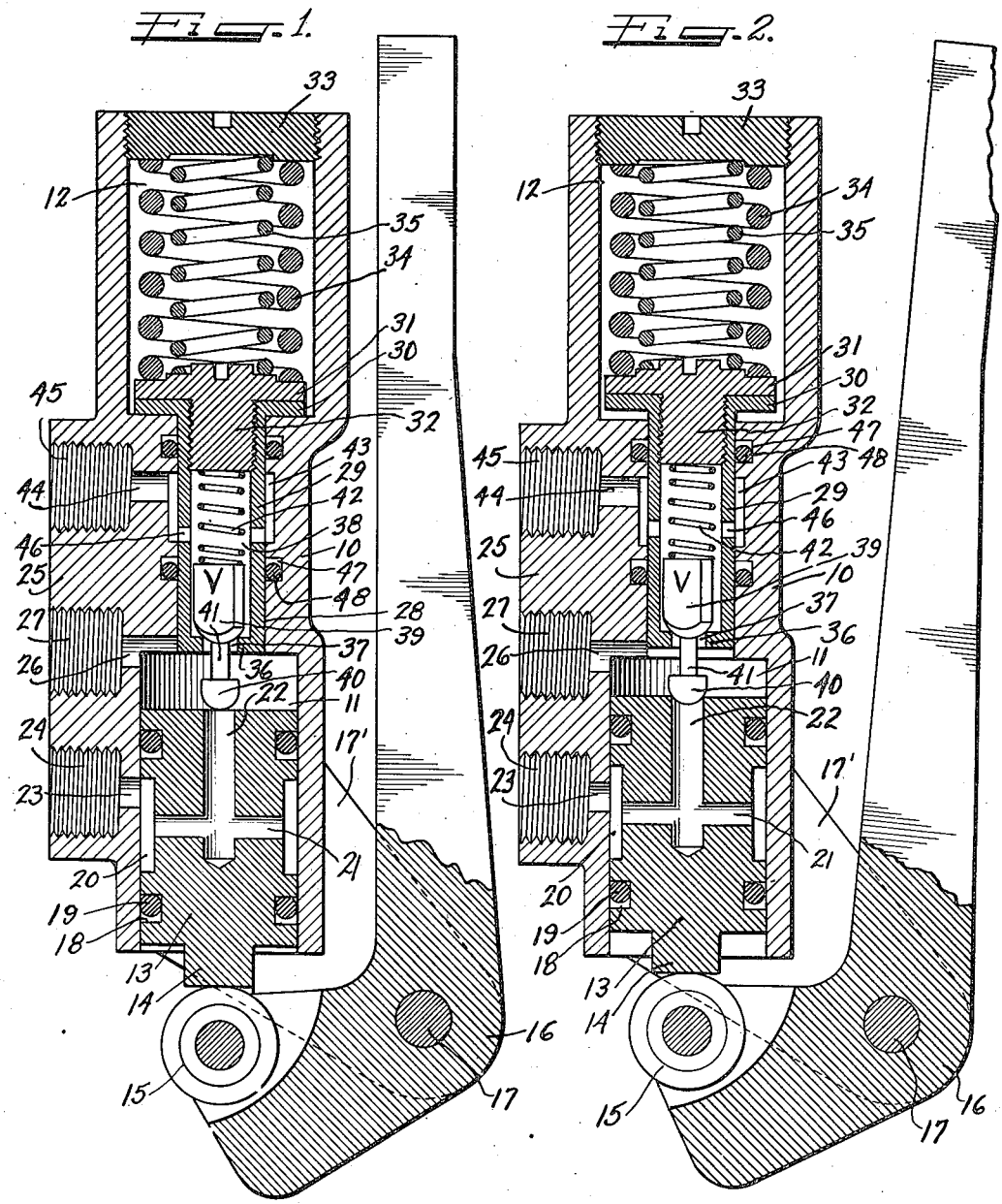
Inventor
GEORGE H. HUFFERD.
by Charles Hill
Attys.

Patented May 1, 1945

2,375,110

UNITED STATES PATENT OFFICE 2,375,110

BRAKE CONTROL VALVE

George H. Hufferd, Grosse Pointe, Mich., assignor to Houdaille-Hershey Corporation, Detroit, Mich., a corporation of Michigan Application August 23, 1943, Serial No. 499,605

2 Claims. (Cl. 303—54)

My invention relates to hydraulic power control valves and particularly to valves to be manipulated for the application of hydraulic fluid under desired pressure to structures to be controlled, as for example, the brakes on vehicles such as airplanes.

My invention relates to that type of valve in which, upon manual operation of a brake lever and resulting setting of the valve structure, a counter pressure is set up against the lever proportionate to the amount of pressure being applied to the brakes, so that the operator may always have the feel of the braking effort.

An important object is to provide a control structure in which a piston is directly set by operation of a brake lever and held in such position for the desired braking pressure, with the setting of the piston effecting closure of a brake release valve and unseating of a pressure inlet valve from a movable seat spring loaded, which seat, upon unseating of the inlet valve, is controlled by the pressure to follow the inlet valve for reseating and closure thereof when the desired braking pressure has been reached.

Another important object is to produce a control structure in which the various operating parts are all in axial alignment, and a simple construction that is easily assembled so that the entire structure may be economically manufactured.

The various features of my invention are embodied in the structure shown on the drawing, in which:

Figure 1 is a longitudinal diametral section of the control valve structure showing it in pressure release position; and Figure 2 is a similar section but showing the arrangement of the parts when the desired pressure in the brake has been established and is being held in the brake.

The structure shown comprises a cylindrical housing 10 in whose lower end is the cylinder chamber 11 and in the upper end the cylindrical chamber 12. Operable in the cylinder space 11 is a piston 13 having abutment lug 14 depending therefrom for engagement by a roller 15 journalled at the end of the short arm of the L-shaped lever 16 whose other arm extends upwardly along the side of the housing, the lever being fulcrumed on a pin 17 supported by a pair of ears 17' extending from the housing. To seal against leakage between the piston and the cylinder space wall the piston is provided with circumferential grooves 18 in which packing rings 19 are inserted. Between the packing rings the piston has the circumferentially extending channel 20 which is connected by cross passages 21 with the release passageway 22 extending downwardly from the top of the piston at the axis thereof. The circumferential channel 20 is always in communication through a port 23 with the threaded opening 24 in the boss 25 on one side of the housing 10. At its upper end, the cylinder space 11 is connected by a port 26 with the threaded outlet 27 in the boss 25.

Between the cylinder spaces 11 and 12, the housing 10 has the bore 28 concentric with the cylinder spaces and providing a guideway for the tubular valve seat member 29. This valve seat member terminates at its upper end in the radial flange 30 within the cylinder space 12. This flange is engaged by a seat member 31 having the threaded extension 32 engaging in the threaded upper end of the seat member to form a closure plug therefor. At its upper end, the cylinder space 12 is closed by the end wall 33, and between this end wall and the seat member 31 is interposed a spring assembly, shown as comprising the outer and inner compression springs 34 and 35 respectively, these springs tending to hold the flange 30 of the seat member 29 against the bottom of the cylinder space 12, as shown in Figure 1.

When the seat member 29 is held in its normal position, it terminates at its lower end at the upper end of the cylinder space 11, and at this lower end there is an internal annular flange 36 forming a valve seat that surrounds the inlet port 37.

The tubular seat member 29 provides the valve chamber 38 for the valve element V. This valve element comprises the upper member 39 having a substantially semi-spherical lower end for engagement with the seat flange 36, and the lower member 40 which has substantially semi-spherical shape, these two valve members being connected by a stem 41. The valve member 40 is in alignment with the axial release passageway 22 in the piston 13, the outer edge of this passageway forming a valve seat for the valve member when the piston is raised. Normally, as shown in Figure 1, the valve member 39 is seated when the piston is down to disconnect the piston passage 22 from the valve member 40. A valve spring 42 interposed between the top of the valve element V and the plug 32 in the upper end of the valve seat member 29 tends to hold the valve down for closure of the port 37.

A portion of the bore 28 is of increased diameter to provide the annular inlet channel 43 around the seat member 29, this channel being connected by a port 44 with the threaded inlet 45 through the boss 25. Ports 46, through the seat member 29, connect the valve chamber 38 at all times with the inlet channel 43. To prevent leakage between the seat member 29 and the surrounding housing 10, channels 47 are provided in the housing above and below the inlet channel 43 in which channels sealing rings 48 are inserted.

When the valve structure is installed in a braking system, the inlet 45 is connected by piping with a pump which draws hydraulic fluid from a reservoir for delivery under pressure to the inlet 45, and the outlet 24 is connected by suitable piping for flow back to the reservoir of the fluid from the brakes when the brakes are to be released. The outlet 27 is connected by suitable piping for delivery to the brakes of the fluid under pressure. The pump, reservoir and piping are not shown as such pump and piping connections are well understood in the art.

Figure 1 shows the valve structure in its normal or inactive condition, the piston 13 being down for opening of the release flow passageway 22, and the valve seat member 29 being down with the inlet valve member 39 seated for closure of the port 37. When the valve structure is installed the valve chamber 38 is always in connection with the inlet 45 to receive fluid under pressure from the pump. However, when the valve V closes the port 37, the combined area of the valve and that of its seat flange 36 subjected to the pressure in the valve chamber, is the same as the area of the inner end of the plug 32 in the upper end of the seat member 29 so that the downward pressure against the valve and the seat 36 and the upward pressure against the plug 32 is the same. In other words, the downward and upward pressure against the seat member 29 is balanced.

If it is now desired to apply pressure to the brakes to be controlled, the upwardly extending arm of the lever 16 is swung for engagement of the roller 15 with the piston 13 for raising of the piston, as indicated on Figure 2. Such raising of the piston results first in engagement of the upper or seat end of the piston passageway 22 with the valve member 40 for closure of this passageway, and then raising of the valve element V for unseating of the valve member 39 for exposure of the inlet port 37. The fluid under pressure can now flow from the valve chamber through the port 37 into the upper end of the cylinder space 11 above the piston and outwardly through port 26 and the outlet 27 through piping to the brakes. At the same time the piston 13 will be subjected to the braking pressure tending to force the piston down, but as the brake lever 16 is held in the position in which it was set by the operator, the piston 13 is held against downward movement. As soon as the valve member 39 is unseated, there will no longer be balanced pressure against the seat member 29, and the braking pressure against the lower end of the seat member exposed in chamber 11 will cause the seat member to move upwardly against the resistance of the loading springs 34 and 35. This hydraulic upward movement continues until the spring loading is equalized and the seat flange 36 receives the valve member 39, whereupon balanced pressure is reestablished in the valve chamber and flow of fluid under pressure through the port 37 into the cylinder space 11 and to the brakes is cut off, the positions of the various parts being shown in Figure 2. The piston 13, while being held up in its set position has its passageway 22 kept closed by the valve element 40, the brakes being now hydraulically held in accordance with the lever setting. If more braking power is desired, the control lever is swung out further for raising the piston 13 higher and for unseating of the valve element 39 for further flow of fluid under pressure into the cylinder space 11 and to the brakes, and resulting follow-up movement of the seat member 29 for re-engagement of its seat with the valve for reclosure of the port 37. When the brakes are to be released, the control lever 16 is swung back to its normal or release position, the fluid pressure in the brakes and in the cylinder space 11 then forcing the piston 13 down for disengagement of its passageway 22 from the valve element 40, the fluid in the brakes then flowing through the piston passageways and the outlet 24 to the reservoir.

When the piston has been raised for application of fluid pressure to the brakes and the seat member 29 is being raised by the pressure, the valve spring 42, which is comparatively light, will hold the valve seated against the piston. The spring assembly 34, 35 is dimensioned to resist upward movement of the seat member against the highest pressure to which the springs may be subjected, and when the spring loading is equalized by the hydraulic load on the seat member the valve member 39 will again be seated to balance the downward and upward pressure on the seat member. Should the seat member overrun slightly upwardly, the valve V will be correspondingly lifted for raising of the valve member 40 on the piston so that the pressure in the brakes is relieved through the piston passageways to permit the spring assembly to move the seat member downwardly until the valve member 40 is again seated on the piston to shut off further relief flow. Should the spring assembly cause slight overtravel downwardly of the seat member, the port 37 will be opened and the seat member subjected to upward pressure and movement until the port 37 is reclosed. Thus the seat member is always held in a position predetermined by the balance of spring load and hydraulic load.

The spring assembly 34, 35 is preloaded and such preloading is adjustable by turning of the abutment 31 whose plug extension 32 threads into the upper end of the seat member 29. When the operator sets the brake lever 16 for upward movement of the piston for the desired braking action, the pressure which then shifts the seat member upwardly against the resistance of the spring assembly 34, 35 will be felt by the operator and he will always know just what braking effort is being applied.

I have thus produced a simple, practical and efficient brake valve structure comprising comparatively few simple operating parts which can be economically manufactured and assembled, and which structure is accurate in its operation for the desired braking action, and which gives the feel of the brakes to the operator under all conditions.

Although I have shown a practical and efficient embodiment of the features of my invention, I do not desire to be limited to the exact construction, arrangement and operation shown and described, as changes and modifications may be made without departing from the scope of the invention.

I claim as follows:

1. A brake control valve comprising a housing having a cylinder space in its lower end and a cylinder space in its upper end and a cylindrical bore between said spaces coaxial therewith, a cylindrical seat member having bearing fit in said bore and defining a cylindrical valve chamber, a head on said seat member within the upper cylinder space, a loaded spring in said upper cylinder space between the upper end thereof and said head tending to hold said head against the bottom of said upper cylinder space with the lower end of the seat member terminating at the lower end of said bore, said housing having an inlet passage for fluid under pressure and an annular space surrounding said seat member and connected with said inlet passage, said seat member having passages for connecting the valve chamber therein with said annular space whereby said valve chamber is at all times open for inflow of fluid under pressure, a piston extending upwardly in said lower cylinder space and having a relief passageway therethrough connected with the exterior of said housing, a lever fulcrumed on said housing engageable with said piston for upward movement thereof, the lower end wall of said seat member having a port therethrough for connecting the valve chamber with the lower cylinder space above said piston, a valve member comprising an inlet valve in said valve chamber for said port and a relief valve in the space above said piston, said piston relief passageway at its upper end forming a seat for said relief valve, a spring within said valve chamber normally holding said valve member for closure of said port by said inlet valve, said piston being normally displaced from said relief valve, an outlet passageway in said housing for connection with the brake of the lower cylinder space above said piston, setting of said brake lever causing upward movement of said piston in said lower cylinder space for engagement of the seat at the end of said relief passageway with said relief valve for closure of said passageway and then raising of said valve element for opening of said port by said inlet valve for flow of the fluid under pressure to the brake and against the upper end of said piston, said seat member being raised against resistance of said loaded spring until the brake pressure balances the spring pressure whereby said seat member will have been shifted into engagement with said inlet valve for re-seating thereof and disconnection of the fluid flow under pressure to the brake.

2. A brake control valve comprising a housing having a cylinder space in its lower end and a cylinder space in its upper end and a cylindrical bore between said spaces coaxial therewith, a cylindrical seat member having bearing fit in said bore and defining a cylindrical valve chamber, a head on said seat member within the upper cylinder space, a loaded spring in said upper cylinder space between the upper end thereof and said head tending to hold said head against the bottom of said upper cylinder space with the lower end of the seat member terminating at the lower end of said bore, said housing having an inlet passage for fluid under pressure and an annular space surrounding said seat member and connected with said inlet passage, said seat member having passages for connecting the valve chamber therein with said annular space whereby said valve chamber is at all times open for inflow of fluid under pressure, a piston extending upwardly in said lower cylinder space and having a relief passageway therethrough connected with the exterior of said housing, a lever fulcrumed on said housing engageable with said piston for upward movement thereof, the lower end wall of said seat member having a port therethrough for connecting the valve chamber with the lower cylinder space above said piston, a valve member comprising an inlet valve in said valve chamber for said port and a relief valve in the space above said piston, said piston relief passageway at its upper end forming a seat for said relief valve, a spring within said valve chamber normally holding said valve member for closure of said port by said inlet valve, said piston being normally displaced from said relief valve, an outlet passageway in said housing for connection with the brake of the lower cylinder space above said piston, setting of said brake lever causing upward movement of said piston in said lower cylinder space for engagement of the seat at the end of said relief passageway with said relief valve for closure of said passageway and then raising of said valve element for opening of said port by said inlet valve for flow of the fluid under pressure to the brake and against the upper end of said piston, said seat member being raised against resistance of said loaded spring until the brake pressure balances the spring pressure whereby said seat member will have been shifted into engagement with said inlet valve for reseating thereof and disconnection of the fluid flow under pressure to the brake, the head on said seating member being adjustable for loading adjustment of said spring.

GEORGE H. HUFFERD.